US012412685B2

(12) United States Patent
Song et al.

(10) Patent No.: US 12,412,685 B2
(45) Date of Patent: Sep. 9, 2025

(54) HIGH SOLDERING STRENGTH TERMINAL FOR SURGE PROTECTION DEVICE

(71) Applicant: Dongguan Littelfuse Electronics Company Limited, Dongguan (CN)

(72) Inventors: Dongjian Song, Dongguan (CN); Ganyang Shen, Dongguan (CN); Yanjing Xiao, Dongguan (CN)

(73) Assignee: Dongguan Littelfuse Electronics Company Limited, Dongguan (CN)

( * ) Notice: Subject to any disclaimer, the term of this patent is extended or adjusted under 35 U.S.C. 154(b) by 146 days.

(21) Appl. No.: 18/101,371

(22) Filed: Jan. 25, 2023

(65) Prior Publication Data

US 2023/0245803 A1 Aug. 3, 2023

(30) Foreign Application Priority Data

Jan. 28, 2022 (CN) ........................ 202210108518.1

(51) Int. Cl.
*H01H 37/76* (2006.01)
*H01C 1/144* (2006.01)

(52) U.S. Cl.
CPC ........... *H01C 1/144* (2013.01); *H01H 37/761* (2013.01); *H01H 2037/762* (2013.01); *H01H 2037/769* (2013.01)

(58) Field of Classification Search
CPC ................. H01C 1/144; H01H 37/761; H01H 2037/762; H01H 2037/769; H01H 2037/763; H01H 85/143
See application file for complete search history.

(56) References Cited

U.S. PATENT DOCUMENTS

| | | | | |
|---|---|---|---|---|
| 9,124,057 | B2 * | 9/2015 | Koyama | H01R 43/0256 |
| 2011/0057763 | A1 * | 3/2011 | Qin | H01C 7/10 338/20 |
| 2012/0086540 | A1 * | 4/2012 | Duval | H01H 37/761 337/1 |
| 2013/0038976 | A1 * | 2/2013 | Hagerty | H01C 7/126 361/104 |
| 2013/0265685 | A1 * | 10/2013 | Zauner | H01T 4/06 361/91.1 |
| 2014/0092514 | A1 * | 4/2014 | Chen | H01C 7/12 361/118 |
| 2018/0268969 | A1 * | 9/2018 | Hu | H01C 1/144 |
| 2019/0080826 | A1 * | 3/2019 | Kamensek | H01H 37/32 |
| 2021/0104372 | A1 * | 4/2021 | Qiu | H01H 85/306 |

* cited by examiner

*Primary Examiner* — Jacob R Crum
(74) *Attorney, Agent, or Firm* — KDW Firm PLLC

(57) ABSTRACT

A surge protection device includes a metal terminal and a spring. The metal terminal is located between two metal oxide varistors, where the metal terminal extends beyond the metal oxide varistors. The spring has a flat surface that is connected to the metal terminal using a soldering paste. The flat surface has a bend on one end which forms a gap between the flat surface and the metal terminal.

9 Claims, 7 Drawing Sheets

HIGH SOLDERING STRENGTH TERMINAL FOR SURGE PROTECTION DEVICE

CROSS REFERENCE TO RELATED APPLICATION

This application claims the benefit of priority to, Chinese Patent Application No. 202210108518.1, filed Jan. 28, 2022, entitled "HIGH SOLDERING STRENGTH TERMINAL FOR SURGE PROTECTION DEVICE," which application is incorporated herein by reference in its entirety.

FIELD OF THE DISCLOSURE

Embodiments of the present disclosure relate to the field of circuit protection and, more particularly, to surge protection devices that employ thermal cutoff.

BACKGROUND

Overvoltage protection devices are used to protect electronic circuits and components from damage due to overvoltage fault conditions. Known variously as surge protection devices (SPDs), lightning surge protection (LSP) devices, and thermal cutoff (TCO) devices, some of these devices employ metal oxide varistors (MOVs). Varistors are voltage dependent, nonlinear devices composed primarily of ZnO with small additions of other metal oxides such as Bismuth, Cobalt, Manganese, and others, resulting in a crystalline microstructure that allows the MOV to dissipate very high levels of transient energy across the entire bulk of the device. MOVs are typically used for the suppression of lightning and other high energy transients found in industrial or AC line applications. Additionally, MOVs are used in DC circuits such as low voltage power supplies and automobile applications.

Some SPDs utilize spring elements soldered to the electrode of the MOV. When an abnormal condition occurs, the solder melts and the spring moves, resulting in an open circuit. In particular, when a voltage that is larger than the nominal or threshold voltage is applied to the device, current flows through the MOV, which generates heat. This causes the linking element, the solder, to melt. Once the link melts, the spring separates from the MOV electrode and an open circuit results, which prevents the MOV from catching fire.

The spring is thus considered an important element in the SPD. A reliable thermal link between the spring and the MOV electrode ensures the formation of an open circuit under the overvoltage condition. The traditional soldering interface between the spring and the MOV electrode may be deficient in terms of the volume of solder paste and the uniformity of application, resulting in unstable soldering strength, which compromises the operation of the SPD.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a surge protection device in accordance with the present disclosure may include a metal terminal and a spring. The metal terminal is located between two metal oxide varistors, where the metal terminal extends beyond the metal oxide varistors. The spring has a flat surface that is connected to the metal terminal using a soldering paste. The flat surface has an opening to allow air bubbles forming in the soldering paste to be released during the connection.

Another exemplary embodiment of a surge protection device in accordance with the present disclosure may include a metal terminal and a spring. The metal terminal is located between two metal oxide varistors, where the metal terminal extends beyond the metal oxide varistors. The spring has a flat surface that is connected to the metal terminal using a soldering paste. The flat surface has a bend on one end which forms a gap between the flat surface and the metal terminal.

An exemplary embodiment of surge protection device in accordance with the present disclosure may include a spring and a metal terminal. The spring has a flat surface. The metal terminal is located between two metal oxide varistors, where the metal terminal extends beyond the metal oxide varistors. The metal terminal is connected to the flat surface using a soldering paste and has a protrusion that forms a gap between the flat surface and the metal terminal.

DETAILED DESCRIPTION

A surge protection device with a thermal cutoff spring is disclosed. Within the soldering joints of the surge protection device are three features to facilitate successful placement of soldering paste between two flat surfaces: one or more openings, a bend, and a protrusion. The one or more openings and the bend are on the flat surface of a spring used for thermal cutoff. The protrusion is part of a metal terminal to which the flat surface is connected. The openings provide an exit for air bubbles within the soldering paste that may occur. The protrusions and the bend provide gaps between the two flat surfaces, which facilitate both control of the amount of soldering paste and targeted positioning of the paste.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
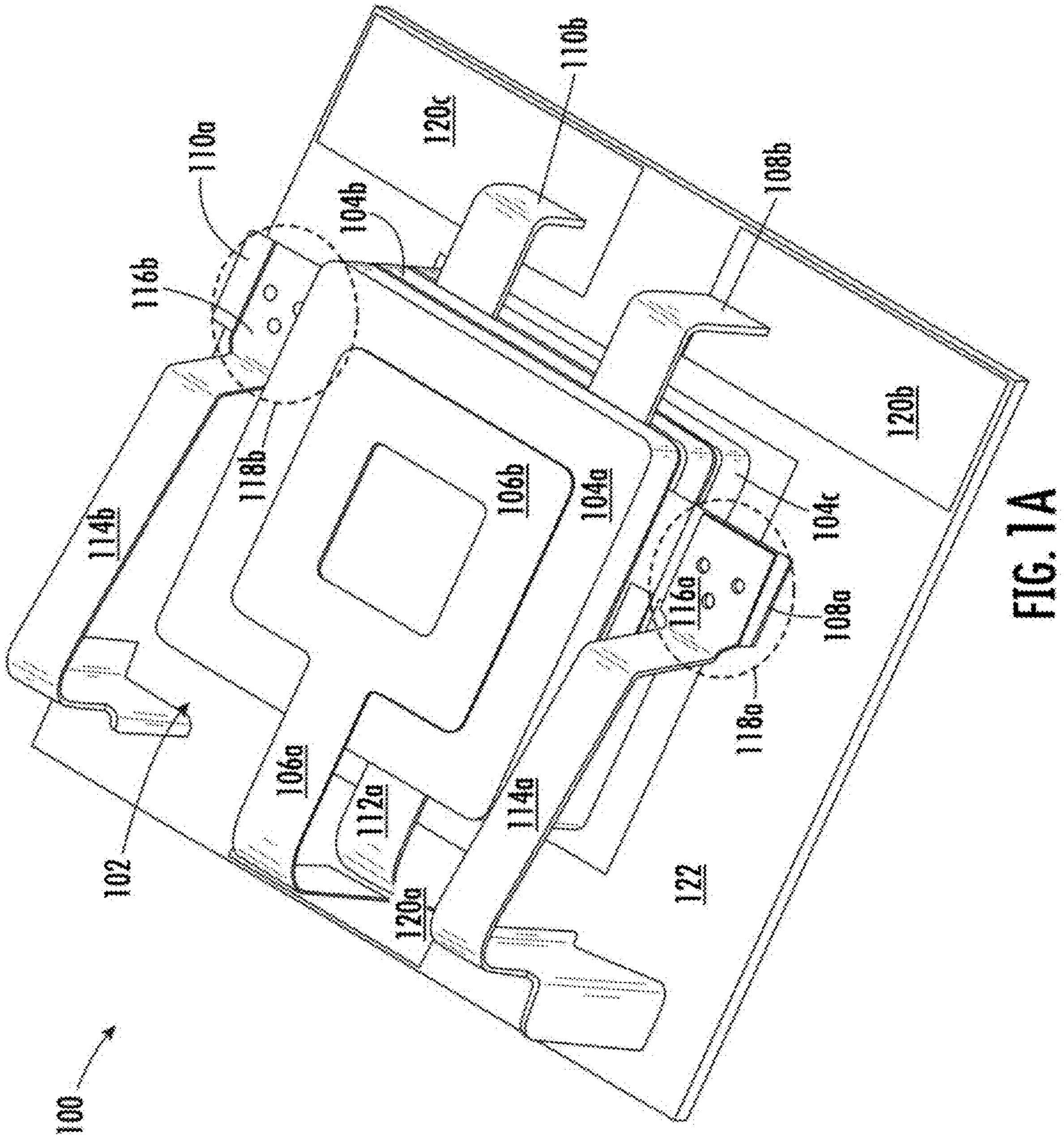
FIGS. 1A-1C are diagrams illustrating a surge protection device, in accordance with exemplary embodiments.
Figure 1B:
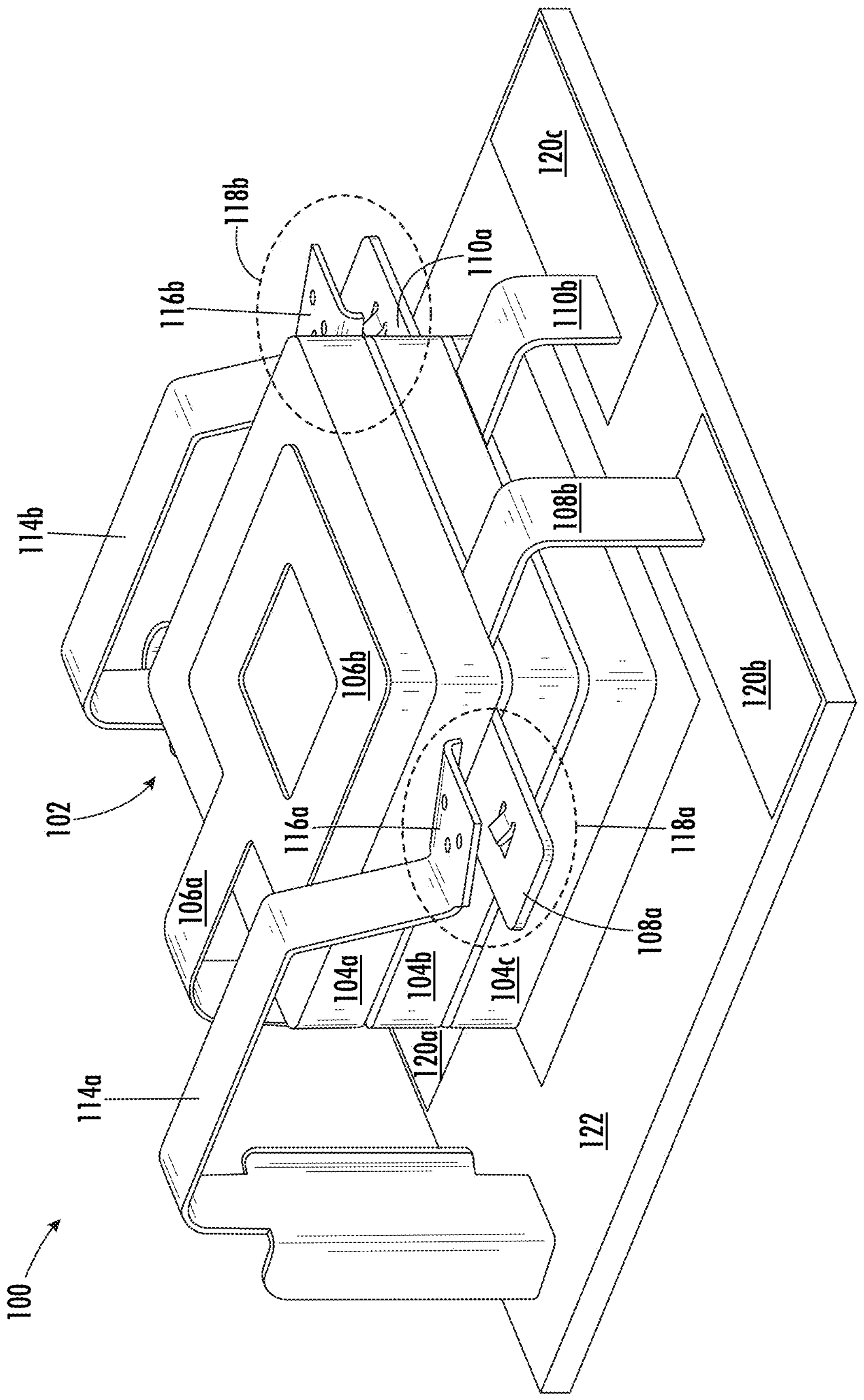
Figure 1C:
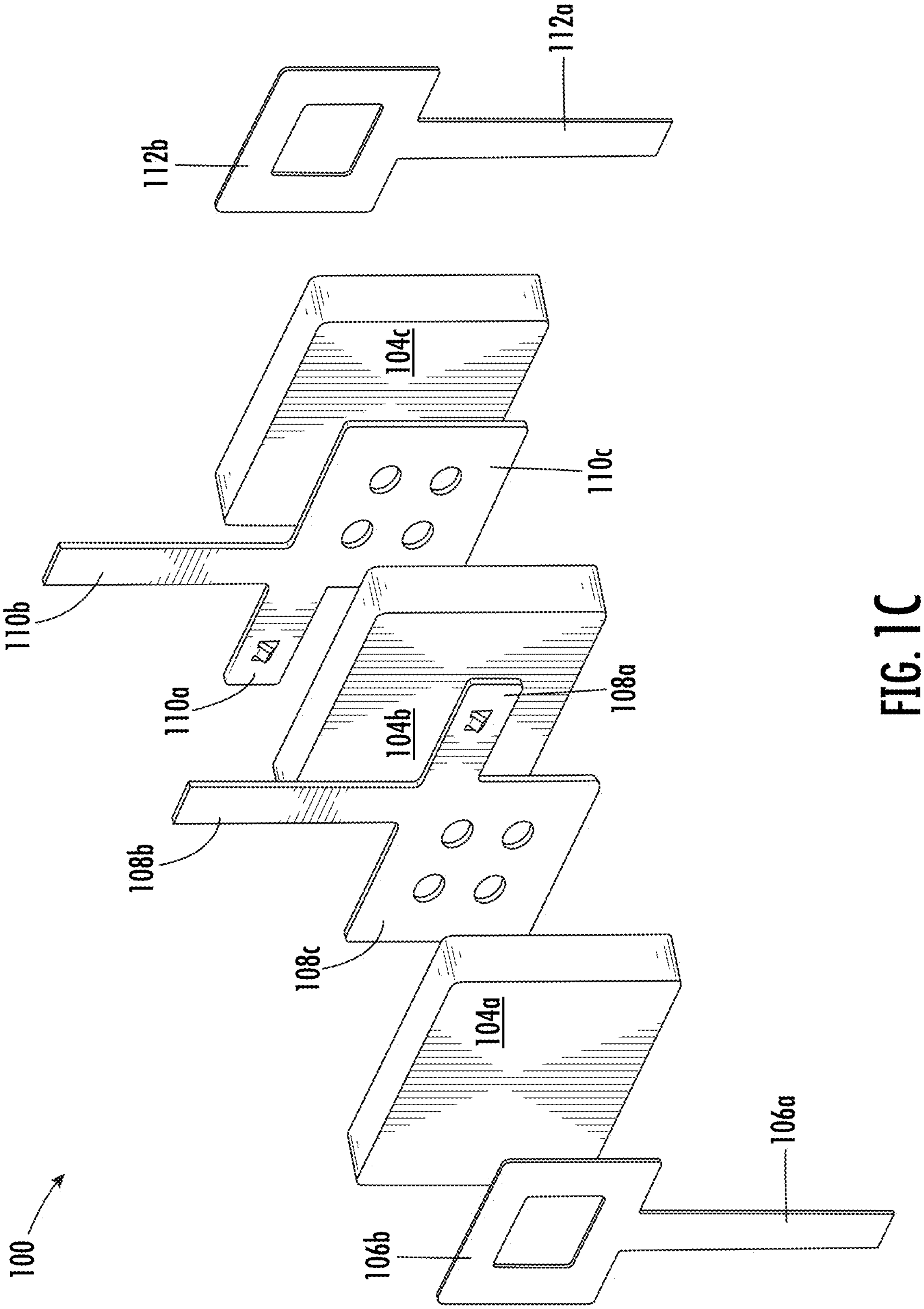

FIGS. 1A-1C are representative drawings of a surge protection device (SPD) 100 for providing overvoltage protection, according to exemplary embodiments. FIG. 1A is a perspective view of the SPD 100 in a first state; FIG. 1B is a perspective view of the SPD in a second state; and FIG. 1C is an exploded perspective view of the SPD. The SPD 100 consists of metal oxide varistors (MOVs) arranged as an MOV stack 102, with metal terminals disposed above, below, and between the MOVs. In exemplary embodiments, the SPD 100 consists of three MOVs 104*a*, 104*b*, and 104*c* (collectively, "MOVs 104") although the SPD may have more or fewer MOVs than are shown.

Above, below, and between the MOVs 104 are metal terminals, with the number of metal terminals being dependent on the number of MOVs. The exploded view of FIG. 1C provides a full view of the metal terminals: a first metal terminal consists of a long terminal 106*a* and a body 106*b* (collectively, "metal terminal 106"); a second metal terminal consists of a short terminal 108*a*, a long terminal 108*b*, and a body 108*c* (collectively, "metal terminal 108"); a third metal terminal consists of a short terminal 110*a*, a long terminal 110*b*, and a body 110*c* (collectively, "metal terminal 110"); and a fourth metal terminal consists of a long terminal 112*a* and a body 112*b* (collectively, "metal terminal 112"). Although distinct portions are called out in the figures, each metal terminal 106, 108, 110, and 112 is formed as a unitary structure of electrically conductive material, such as copper, in exemplary embodiments.

With reference also to FIGS. 1A-1B, metal terminal 106 is disposed atop the MOV stack 102, specifically, adjacent the MOV 104*a*; metal terminal 108 is disposed between MOV 104*a* and MOV 104*b*, with the body 108*c* being sandwiched between the MOVs and the short terminal 108*a* and the long terminal 108*b* extending beyond the structure of the MOVs; metal terminal 110 is disposed between MOV 104*b* and MOV 104*c*, with the body 110*c* being sandwiched between the MOVs and the short terminal 110*a* and the long terminal 110*b* extending beyond the structure of the MOVs; and metal terminal 112 is disposed at the bottom of the MOV stack 102, specifically, adjacent the MOV 104*c*. The long terminals 106*a*, 108*b*, 110*b*, and 112*a* are to be bent for connection to a PCB 122. Long terminals 106*a* and 112*a* are bent and connected to a pad 120*a*; long terminal 108*b* is bent and connected to a pad 120*b* and long terminal 110*b* is bent and connected to a pad 120*c* (collectively, "pads 120"). In exemplary embodiments, the long terminals 106*a*, 108*b*, 110*b*, and 112*a* are soldered to respective pads 120.

In exemplary embodiments, the SPD 100 also includes a pair of springs 114*a* and 114*b* (collectively, "springs 114"). Each spring 114 features a flat surface for coupling (soldering) to metal terminals: flat surface 116*a* of spring 114*a* is soldered to metal terminal 108*a* and flat surface 116*b* of spring 114*b* is soldered to metal terminal 110*a* (collectively, "flat surfaces 116"). The springs 114 provide a mechanism by which the SPD 100 is uncoupled (released) from connection to a device, such as a power supply in response to an overvoltage condition.

In FIGS. 1A and 1B, a circled soldering joint 118*a* includes the flat surface 116*a* of the spring 114*a* and the metal terminal 108*a*; similarly, a circled soldering joint 118*b* includes the flat surface 116*b* and the metal terminal 110*a* (collectively, "soldering joints 118"). The flat surface 116*a* of spring 114*a* is affixed to the metal terminal 108*a* and the flat surface 116*b* of spring 114*b* is affixed to the metal terminal 110*a* using a soldering paste. The flat surface 116*b* is disposed over and close to the metal terminal 110*a*.

In exemplary embodiments, the soldering paste is selected to have a particular melting point that is consistent with the rating of the SPD 100. For example, the soldering paste may be low melting point solder paste consisting of 42% tin (Sn) and 58% bismuth (Bi), which has a melting point of 138° C. Until an overvoltage condition for which the SPD 100 is designed occurs, current flows through the SPD (normal operation). FIG. 1A shows the SPD 100 during normal operation, with spring 114*a* soldered to the metal terminal 108*a* and spring 114*b* soldered to the metal terminal 110*a*.

To provide surge protection, the SPD 100 does the following: An overvoltage condition occurs, causing the MOV stack 102 to overheat. Heat is transferred to the metal terminals 106, 108, 110, and 112, with more substantial heat being transferred to the metal terminals that are in between MOVs 204, namely, the metal terminals 108 and 110. Respective soldering joints 118*a* and 118*b* melt, causing the flat surface 116*a* of spring 114*a* to move away from the metal terminal 108*a* and the flat surface 116*b* of spring 114*b* to move away from the metal terminal 110*a*. FIG. 1B shows the SPD 100 during the overvoltage event, with spring 114*a* decoupled from the metal terminal 108*a* and spring 114*b* decoupled from the metal terminal 110*a*. The distance between the flat portions 116 and respective metal terminals 108*a* and 110*a* may form a gap of between 3 and 8 mm, for example. This results in an open circuit between the SPD 100 and the circuit to which the SPD is connected, such as a power supply. The MOV stack 102 is thus able to cool down, with the sequence of operations preventing the SPD 100 from burning.

The springs 114 of the SPD 100 are designed to become uncoupled from respective metal terminals upon occurrence of an overvoltage event for which the SPD is rated. Once the overvoltage event occurs, the flat surface 116*a* of the spring 114*a* becomes uncoupled from the metal terminal 108*a* and the flat surface 116*b* of the spring 114*b* becomes uncoupled from the metal terminal 110*a*. In this way, an open circuit is formed.

SPD devices are thus successful by having a reliable thermal link between the flat portion of the spring and the metal electrode to which they are affixed to form open circuit under the overvoltage condition. This depends on having the correct soldering paste for the overvoltage characteristics of the SPD device, as well as the proper placement and quantity of soldering paste. In exemplary embodiments, the SPD 100 includes features in the soldering joints 118 that improve the quality of soldering between the flat surfaces and the metal terminals. To understand and appreciate the improved features, a discussion of an SPDs according to the prior art is appropriate.

Figure 2B:
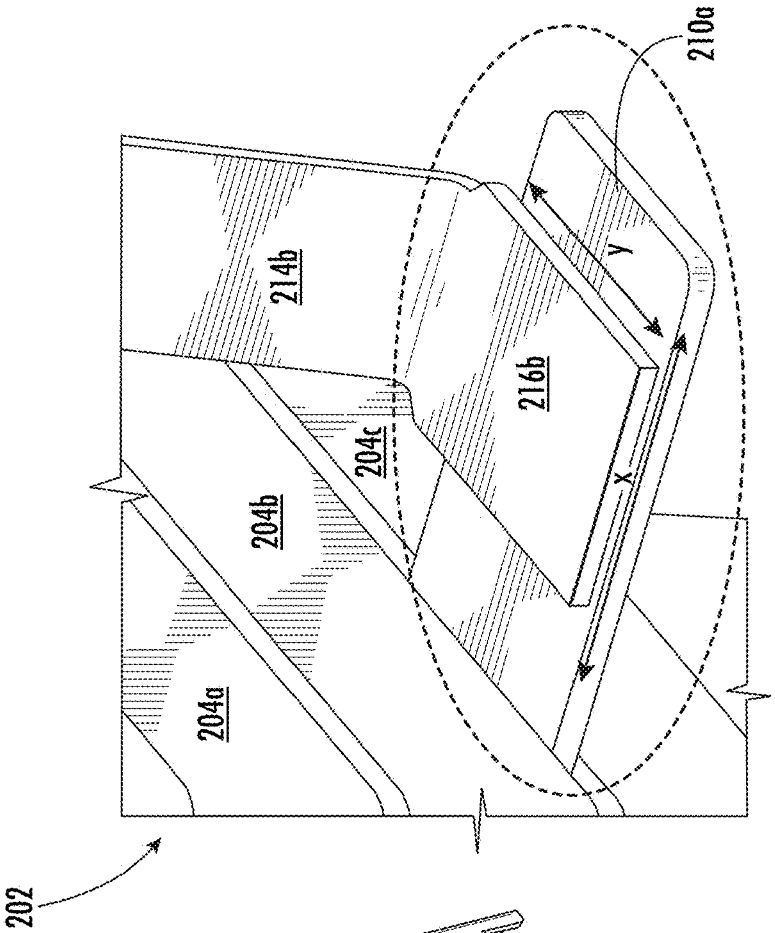
FIG. 2B (PRIOR ART)
FIGS. 2A-2B are diagrams illustrating a surge protection device, in accordance with the prior art.
Figure 2A:
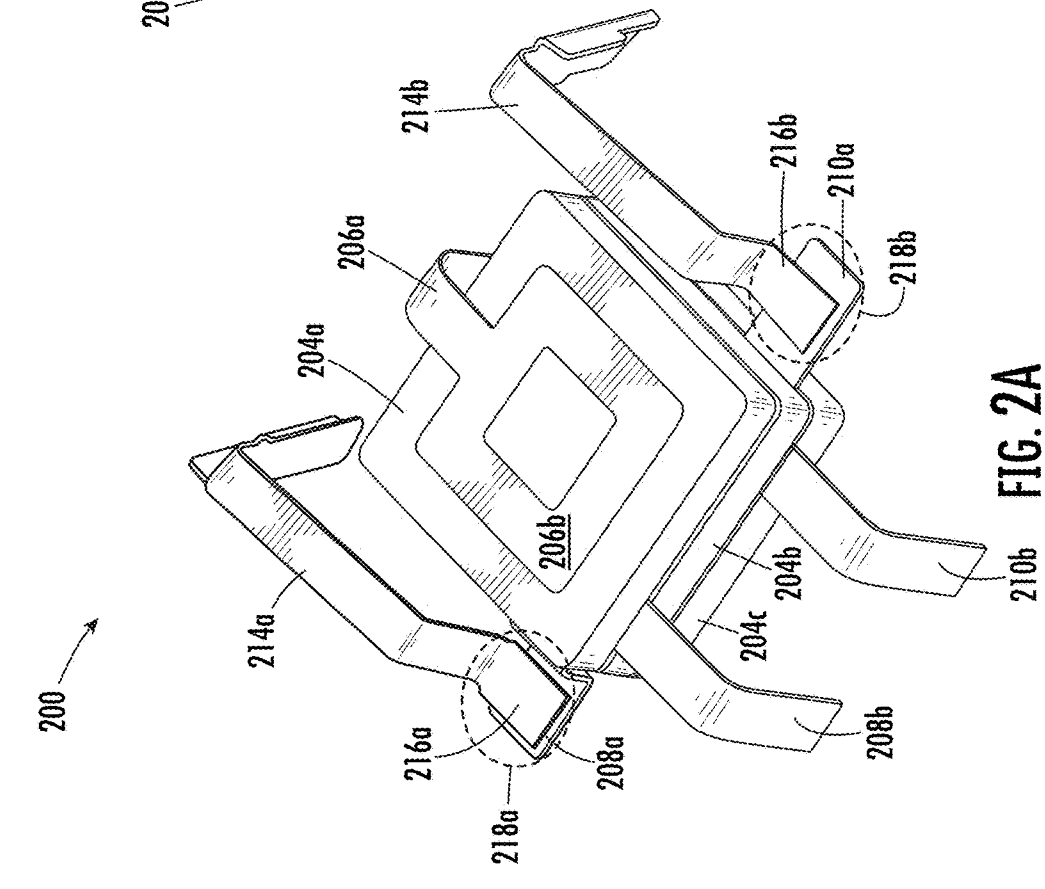
FIG. 2A (PRIOR ART)

FIGS. 2A-2B are representative drawings of a surge protection device (SPD) 200, according to the prior art. FIG. 2A is a perspective view of the SPD 200 and FIG. 2B is a closeup perspective view of a component of the SPD. The SPD 200 consists of an MOV stack 202 with metal terminals disposed above, below, and between the MOVs. The SPD 200 consists of three MOVs 204*a*, 204*b*, and 204*c* (collectively, "MOVs 204") although the SPD may have more or fewer MOVs than shown.

Above, below, and between the MOVs 204 are metal terminals, with the number of metal terminals being dependent on the number of MOVs. Although there is no exploded view of the SPD 200, the configuration of metal terminals and MOVs is similar to that of the exemplary SPD 100, with the visible portions of the metal terminals being called out herein. A first metal terminal consists of a long terminal 206*a* and a body 206*b* (collectively, "metal terminal 206"); a second metal terminal consists of a short terminal 208*a* and a long terminal 208*b* (collectively, "metal terminal 208"); a third metal terminal consists of a short terminal 210*a* and a long terminal 210*b* (collectively, "metal terminal 210").

Metal terminal 206 is disposed atop the MOV stack 202, specifically, adjacent the MOV 204*a*; metal terminal 208 is disposed between MOV 204*a* and MOV 204*b*; metal terminal 210 is disposed between MOV 204*b* and MOV 204*c*; a fourth terminal (not shown) is disposed at the bottom of the MOV stack 202, specifically, adjacent the MOV 204*c*. The long terminals 206*a*, 208*b*, and 210*b* are to be bent for connection to a PCB (not shown).

As with the exemplary SPD 100, the prior art SPD 200 includes a pair of springs 214*a* and 214*b* (collectively, "springs 214"). Each spring 214 features a flat surface for soldering to metal terminals: flat surface 216*a* of spring 214*a* is soldered to metal terminal 208*a* and flat surface 216*b* of spring 214*b* is soldered to metal terminal 210*a* (collectively, "flat surfaces 216").

In FIG. 2A, a circled soldering joint 218*a* includes the flat surface 216*a* of the spring 214*a* and the metal terminal 208*a*; similarly, a circled soldering joint 218*b* includes the flat surface 216*b* and the metal terminal 210*a* (collectively, "soldering joints 218"). FIG. 2B provides a closeup view of the soldering joint 218*b*. The flat surface 216*a* of spring 214*a* is affixed to the metal terminal 208*a* and the flat surface 216*b* of spring 214*b* is affixed to the metal terminal 210*a* using a soldering paste. The flat surface 216*b* is disposed over and close to the metal terminal 210*a*, with the soldering paste being selected to have a particular melting point that is consistent with the rating of the SPD 200.

As with the SPD 100 (FIGS. 1A-C), the SPD 200 may be disposed on a printed circuit board (not shown) and connected to an electronic device, such as a power supply. Until an overvoltage condition for which the SPD 200 is designed occurs, current flows through the SPD as normal. But during an overvoltage event, the MOV stack 202 overheats, heat is transferred to the metal terminals, causing the soldering joints 218 to melt, with the flat portions 216 of each spring 214 to move away from respective metal terminals 208*a* and 210*a*, resulting in an open circuit between the SPD 200 and the device to which it is connected, such as a power supply. The MOV stack 202 is able to cool down and a fire hazard or destruction of either the SPD 200, the power supply, or both, are avoided.

SPD devices are thus successful by having a reliable thermal link between the flat portion of the spring and the metal electrode to which they are affixed to form an open circuit during the overvoltage event. The reliable thermal link depends on having the correct soldering paste for the overvoltage characteristics of the SPD device. Further, the traditional soldering interface for the SPD 200 is for a first flat surface to directly touch a second flat surface. FIG. 2B is instructive in illustrating the drawbacks of the prior art SPD 200.

First, the volume of solder paste cannot be precisely controlled and easily be pushed away during application on the prior art SPD 200. The solder paste is to be applied to the metal terminal 210*a*, then the flat surface 216*b* of the spring 214*b* is positioned over the soldering paste. The soldering paste is thus sandwiched between the metal terminal 210*a* and the flat surface 216*b*. Depending on the precise application of the flat surface 216*b* on the soldering paste, the pressure applied to the metal terminal 210*a*, and other factors, the soldering paste may ooze out between the two surfaces, resulting in an inconsistent amount of soldering paste in between the two flat surfaces. By not having a consistent amount of soldering paste at the soldering interface, an unstable soldering strength may result.

Second, the application of the soldering paste may result the formation of air bubbles between the two flat surfaces, the metal terminal 210*a* and the flat surface 216*b*. It is difficult to determine whether there are air bubbles during application because the flat surface 216*b* of the spring 214*b* is not transparent. Further, even when the presence of the air bubbles is known, it is difficult to eliminate the air bubbles from forming between the two flat surfaces. The presence of air bubbles may depend to some extent on the chemical makeup of the soldering paste. Since the soldering paste is formulated based on a desired melting point of the soldering paste and thus voltage rating of the SPD, the air bubbles present an additional condition that negatively affects the soldering strength and reliability.

Third, there are two flat surfaces, the metal terminal 210*a*, which is stationary, and the flat surface 216*b* of the spring 214*b*, which, until the soldering paste is applied, is not stationary. Further, the shape of the flat surfaces is not identical: the rectangular shape of the metal terminal 210*a* has a larger area than the rectangular shape of the flat surface 216*b*. Thus, during application of the soldering paste, the flat surface 216*b* may move closer to the MOVs 204*b* and 204*c* or farther away from the MOVs, as shown by arrow, x. Or the flat surface 216*b* may move in parallel to the MOVs 204*b* and 204*c* but move in the directions shown by arrow, y (orthogonal to x). Even still, the flat surface 216*b* may move so that it is not orthogonal to the metal terminal 210*a*. Because the flat surfaces of the metal terminal 210*a* and the flat surface 216*b* are able to easily slide relative to one other and are not fixed, the resulting soldering strength is unpredictable. Any one of the above problems may produce defective soldering, and thus deficient operation of the prior art SPD 200.

Figure 3B:
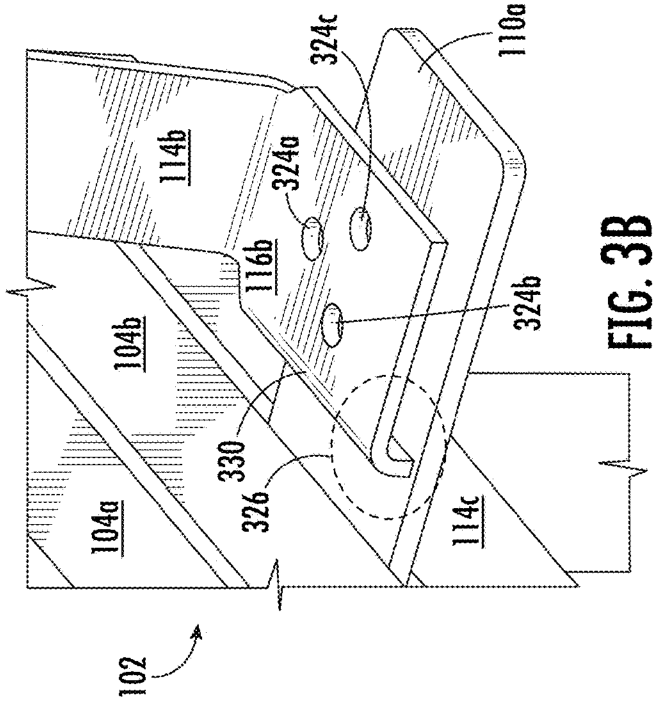
FIGS. 3A-3C are diagrams further illustrating the surge protection device of FIGS. 1A-1C, in accordance with exemplary embodiments.
Figure 3C:
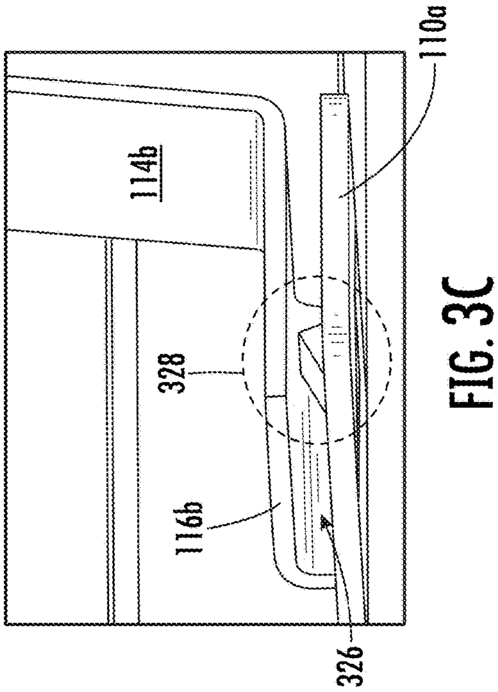
Figure 3A:
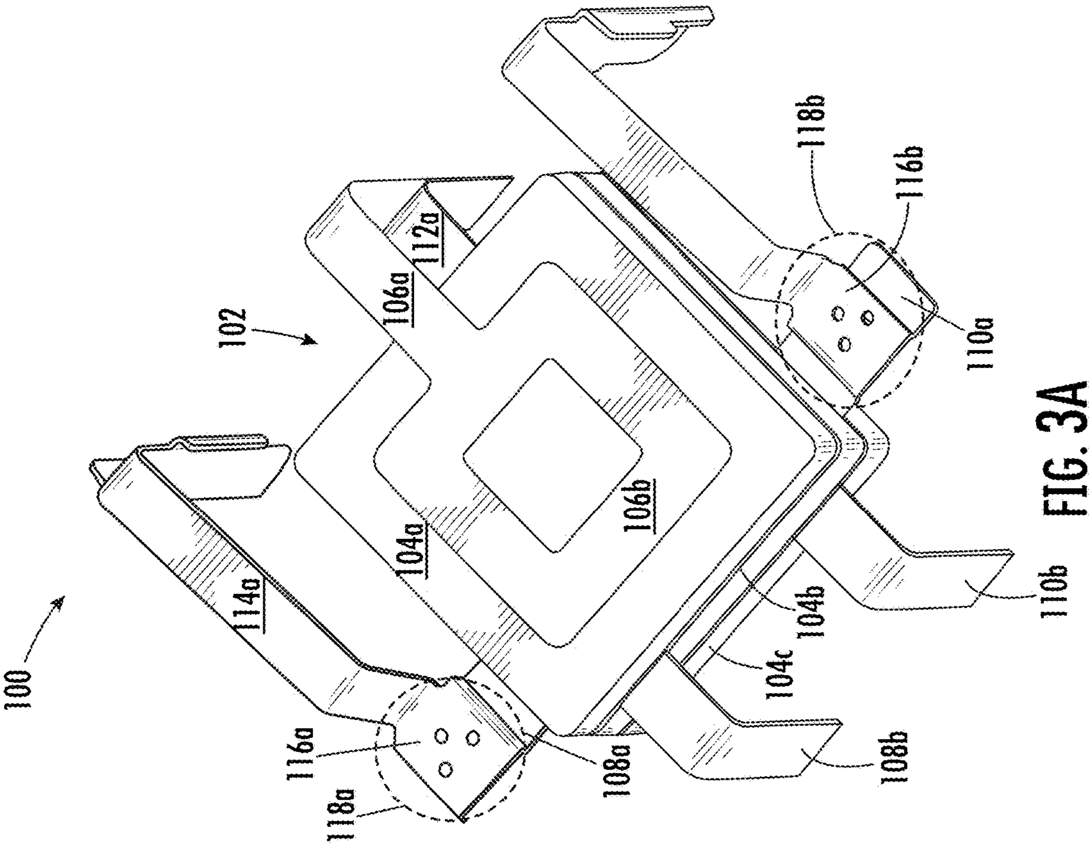

FIGS. 3A-3C are representative drawings of the SPD 100 already introduced in FIGS. 1A-1C, according to exemplary embodiments. FIG. 3A is a perspective view of the SPD 100 and FIGS. 3B-3C are closeup perspective views of the novel features of the SPD. In addition to the aforementioned features, the SPD 100 includes novel elements, located within the soldering joints 118: openings 324*a-c* (collectively, "openings 324"), a bend 326, and a protrusion 328. In exemplary embodiments, the novel elements solve the problems found with the application of soldering paste in the SPD 200 described above.

In exemplary embodiments, the openings 324 are located in the flat surfaces 116 of the springs 114. Although three openings 324*a*, 324*b*, and 324*c* are shown, the flat surfaces 116 may have more or fewer openings. Further, the openings 324 do not have to be circular, they may any shape or size depending on what is needed. A soldering paste made of a thicker composition of materials may warrant having larger openings, for example. In exemplary embodiments, as the soldering paste is applied between the flat surfaces 116 and the metal terminals 108*a* and 110*a*, the openings 324 provide a pathway in which air bubbles formed in the soldering paste are able to escape.

Using the spring 114*a* and the metal terminal 108*a* as an example, the soldering paste is applied to the metal terminal 108*a*, then the flat surface 116*a* of the spring 114*a* is disposed over and pressed toward the metal terminal. If air bubbles form within the soldering paste, the openings 324 provide an escape route for the air bubbles to move upward during the downward press of the flat surface 116*a* onto the metal terminal 108*a*. The openings 324 thus help to void air bubbles that form inside the soldering joints 118.

In exemplary embodiments, the bend 326 is a modification of the flat surface 116 of the spring 114. Both springs 114 include bends 326, though one is featured in the detailed drawings of FIGS. 3B and 3C. Bend 326 extends along the length of one side 330 of the flat surface 116*b*, in exemplary embodiments. Alternatively, the bend 326 may extend along other sides of the flat surface 116*b*. The bend 326 is shown and described in more detail in FIGS. 4B and 4C, below. In exemplary embodiments, the bend 326 provides a gap of a predetermined size between the metal terminal 110*a* and the flat surface 116*b* of the spring 114*b*. Further, in exemplary embodiments, the bend 326 helps to control the amount (a quantity) of soldering paste used to secure the two flat surfaces together. The bend 326 provides a barrier to prevent the soldering material from oozing out from between the flat surfaces. The bends 326 thus help to maintain a specific gap between the metal terminal and flat surface of the spring to ensure there is enough solder paste to provide a desired soldering strength, which helps to precisely control the usage of soldering paste.

While the openings 324 and the bend are part of the springs 114, the protrusions 328 are part of the metal terminals 108*a* and 110*a*. As illustrated in FIG. 3C, the protrusion 328 is a raised structure of the metal terminal 110*a*. In exemplary embodiments, the protrusion 328 provides a gap between the two flat structures. The protrusion 328 is shown and described in more detail in FIGS. 5B and 5C, below. The protrusion 328 thus provides an adjustable distance for soldering paste feeding, which helps to precisely control the remaining soldering paste amount in the soldering interface. Recall from FIG. 2B how movement of the flat surface 216*b* of the prior art SPD 200 is difficult to control during the soldering paste operation. In exemplary embodiments, the protrusion 328 acts as a stopper to limit movement of the flat surface 116 of the spring 114, which helps to fix the soldering field.

Figure 4B:
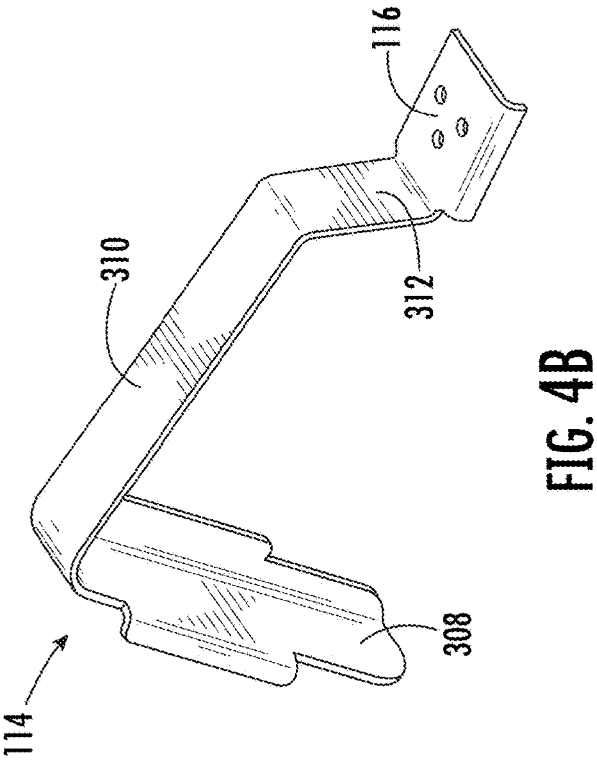
FIGS. 4B-4C are diagrams illustrating the spring used by the surge protection device of FIGS. 1A-1C, in accordance with exemplary embodiments.
Figure 4C:
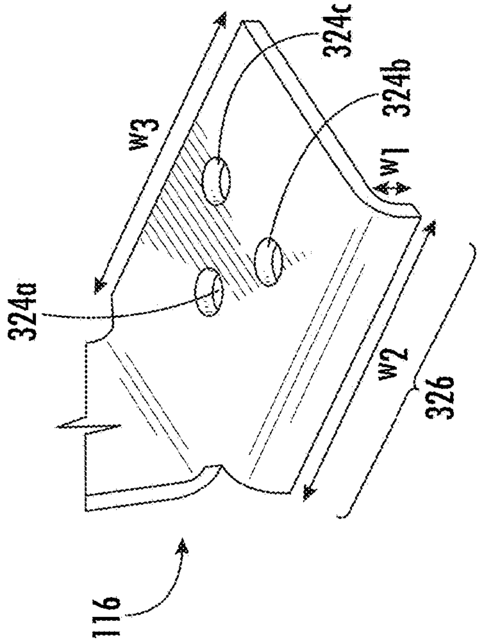
Figure 4A:
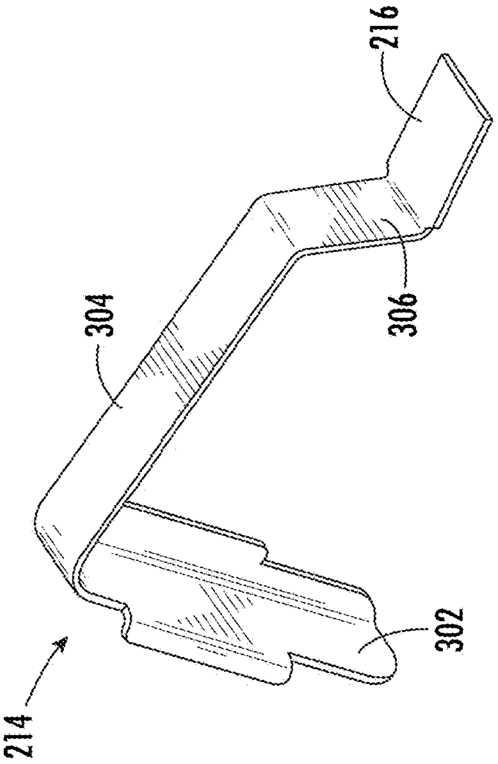
FIG. 4A (PRIOR ART)
FIG. 4A is a diagram illustrating the spring used by the surge protection device of FIGS. 2A-2B, in accordance with the prior art.

FIGS. 4A-4C are representative drawings comparing the novel spring 114 (SPD 100) with the prior art spring 214 (SPD 200), according to exemplary embodiments. FIG. 4A is the spring 214 of the prior art SPD 200 (FIGS. 2A-2B); FIG. 4B is the spring 114 of the novel SPD 100 (FIGS. 1A-1C and 3A-3C); and FIG. 4C is a closeup view of the flat surface of the novel spring.

The prior art spring 214 is illustrated in FIG. 4A and the novel spring 114 is illustrated in FIG. 4B. The springs 114 and 214 are made of a rigid material, such as beryllium copper, steel, aluminum, or alloys of steel and aluminum having several pieces that are bent to enable a spring-like response. Prior art spring 214 includes first portion 302, second portion 304, third portion 306, and the already introduced flat surface 216.

The first portion 302 touches and rests on the surface to which the SPD 200 is mounted, such as a printed circuit board. The second portion 304 is somewhat orthogonal to the first portion 302 and is connected between the first portion and the third portion 306. The third portion 306 is bent relative to the second portion 304 at an obtuse angle (e.g., greater than 90 degrees). The flat surface 216, as already shown and described, is designed to be soldered to a metal electrode of the SPD 200, and is disposed at an obtuse angle relative to the third portion 306. The four portions are arranged so that the flat surface 216 will move upward in response to an overvoltage event, thus disengaging the flat surface from the metal electrode of the SPD 200.

The novel spring 114 in FIG. 4B is similarly made up of four portions, a first portion 308, which is to sit on the PCB (see, e.g., FIGS. 1A and 1B), a second portion 310, a third portion 312, and the already introduced flat surface 116. The angular arrangement of the novel spring 114 is similar to that of the prior art spring 214. In contrast to the prior art spring 214, the novel spring 114 includes, on the flat surface 116, the openings 324 and the bend 326 shown also in FIG. 3B.

In exemplary embodiments, the openings 324 help to mitigate the occurrence of air bubbles in the soldering paste that may be disposed between the metal terminal of the SPD 100 and the flat surface 116 while the bend 326 helps to prevent soldering paste oozing from between the flat surface 116 and the metal terminal. Further, as illustrated in FIG. 4C, the bend 326 provides a gap of distance $w_3$ between the metal terminal and the flat surface 116. In exemplary embodiments, the gap facilitates controlling the amount of soldering paste that is used to secure the flat surface 116 to the metal terminal of the SPD 100.

The bend 326 extends along one side of the flat surface 116 and has a width, $w_2$ while the flat surface has a width, $w_3$. In exemplary embodiments, the two widths are the same, that is, $w_2=w_3$. The bend 326 may alternatively be on another side of the flat surface 116, whether the side orthogonal or opposite to its current location. Or the spring 114 may have multiple bends disposed on more than one side of the flat surface 116.

Figure 5B:
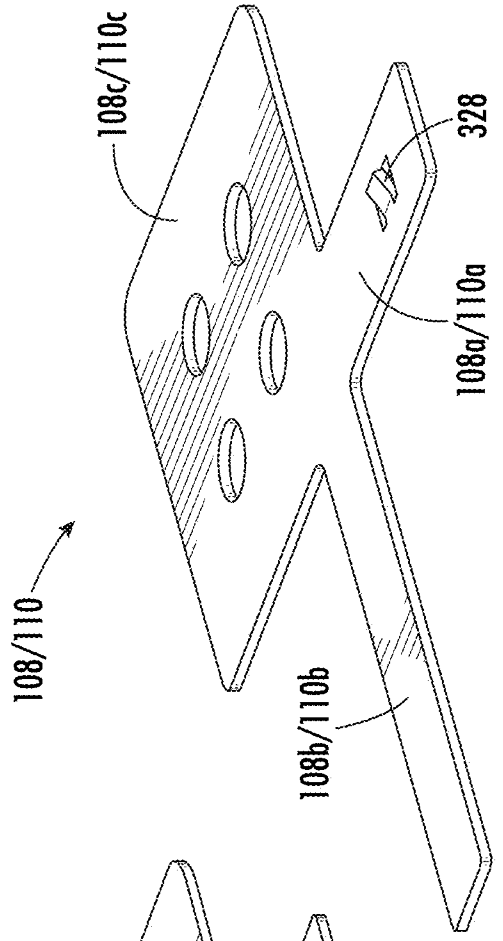
FIGS. 5B-5C are diagrams illustrating the metal terminal used by the surge protection device of FIGS. 1A-1C, in accordance with exemplary embodiments.
Figure 5C:
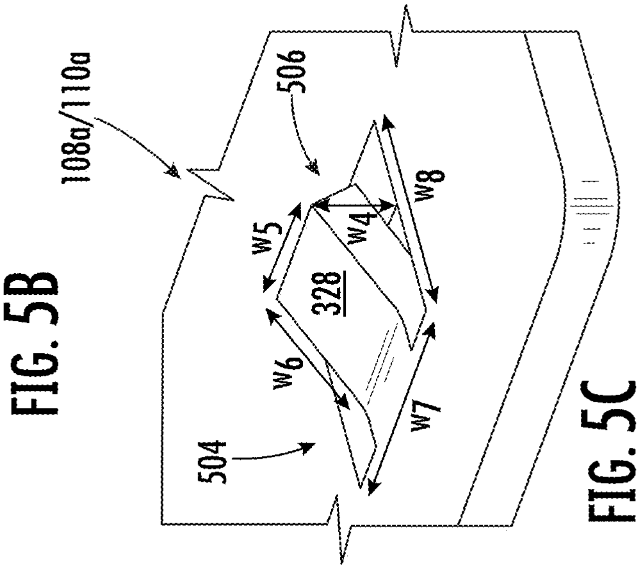
Figure 5A:
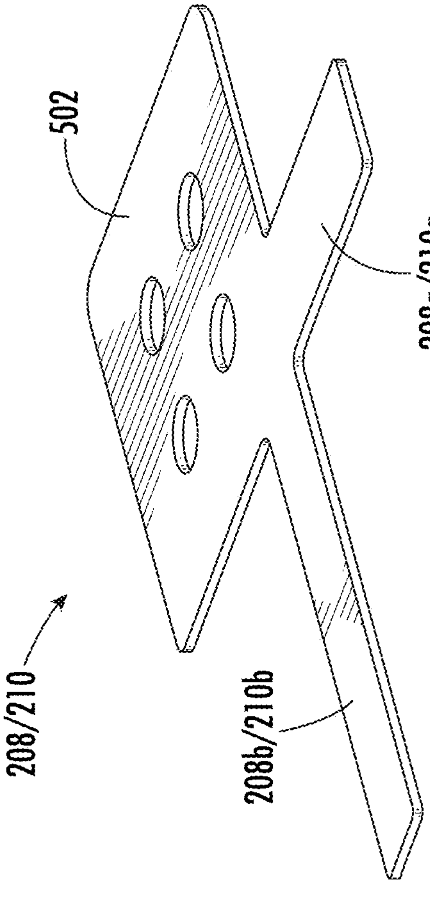
FIG. 5A (PRIOR ART)
FIG. 5A is a diagram illustrating the metal terminal used by the surge protection device of FIGS. 2A-2B, in accordance with the prior art.

FIGS. 5A-5C are representative drawings comparing the novel metal terminals 108 and 110 (SPD 100) with the prior art metal terminal 208 and 210 (SPD 200), according to exemplary embodiments. FIG. 5A is the metal terminal 208/210 of the prior art SPD 200 (FIGS. 2A-2B); FIG. 5B is the metal terminal 108/110 of the novel SPD 100 (FIGS. 1A-1C and 3A-3C); and FIG. 5C is a closeup view of the protrusion 328 of the novel metal terminal.

The prior art metal terminal, which may be either metal terminal 208 or metal terminal 210 (FIGS. 2A-2B), is illustrated in FIG. 5A; the novel metal terminal, which may be either metal terminal 108 or metal terminal 110, is illustrated in FIG. 5B. The metal terminals 108, 110, 208, and 210 are made of an electrically conductive material, such as copper or copper alloy. The prior art metal terminals 208/210 are made up of the short terminal 208*a*/210*a*, the long terminal 208*b*/210*b* and a body 502. The short terminal 208*a*/210*a* and the long terminal 208*b*/210*b* stick out from the MOV stack, with the long terminal being bent while the body 502 is disposed between two MOVs (see, e.g., FIG. 2A).

The novel metal terminal is similarly made up of an electrically conductive material, with a short terminal 108*a*/110*a*, a long terminal 108*b*/110*b* and a body 108*c*/110*c*. The short terminal 108*a*/110*a* and the long terminal 108*b*/110*b* stick out from the MOV stack, with the long terminal being bent while the body 108*c*/110*c* is disposed between two MOVs (see, e.g., FIGS. 1A-1B). In contrast to the prior art metal terminals 208/210, the novel metal terminals 108/110 feature the protrusion 328 disposed on the short terminal 108*a*/110*a*.

In exemplary embodiments, the protrusion 328 provides a gap, $w_4$, between the metal terminal 108*a*/110*a* and the flat surface of the spring. Like the bend 326 of the novel spring 114, the protrusion 328 provides space for a controlled amount of soldering paste to be applied between the flat surface 116 of the spring 114 and the metal terminal 108*a*/

110*a*. In exemplary embodiments, the gap of the bend 326, $w_1$, is equal to the gap of the protrusion 328, $w_4$, $w_1=w_4$.

As illustrated in FIG. 5C, the protrusion 328 is created by cutting a rectangular shape 504 having dimensions $w_7 \times w_8$ into the metal terminal 108*a*/110*a* and, from the rectangular shape 504, cutting another, smaller rectangular shape 506 having dimensions $w_5 \times w_6$, with $w_5<w_7$ and $w_6<w_8$. Next, the smaller rectangular shape 506 having dimensions $w_5 \times w_6$ is bent upward by a distance, $w_4$ to form the protrusion 328. Because the metal terminal 108*a*/110*a* is a soft metal (copper or copper alloy), the bending of the smaller rectangular shape 506 with dimensions $w_5 \times w_6$ is possible.

In exemplary embodiments, the novel SPD 100 which provides a high soldering strength thermal cutoff terminal can be extended to all flat surfaces of the SPD. The use of the openings 324 and the bend 326 in the spring as well as the protrusion 328 in the metal terminal can be extended to other flat surfaces being connected using soldering paste, not just the springs and the metal terminals. With ease of assembly and low cost, the principles described herein can be applied to a wide variety of metal soldering operations. The result is high soldering performance to enhance soldering strength and product reliability.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A surge protection device comprising:

a metal terminal comprising:

a body disposed between two metal oxide varistors in direct contact with surfaces of the metal oxide varistors;

a short terminal extending beyond outermost peripheries of the metal oxide varistors in a first direction parallel to the surfaces of the metal oxide varistors; and a long terminal extending beyond outermost peripheries of the metal oxide varistors in a second direction parallel to the surfaces of the metal oxide varistors and perpendicular to the first direction; and a spring comprising a flat surface, the flat surface to be coupled to the metal terminal using a soldering paste, the flat surface further comprising an opening to allow air bubbles forming in the soldering paste to be released during the coupling.

2. The surge protection device of claim 1, the flat surface further comprising a bend disposed on one end of the flat surface, the bend to form a gap between the flat surface and the metal terminal.

3. The surge protection device of claim 2, wherein the gap controls a quantity of soldering paste applied to the metal terminal.

4. The surge protection device of claim 3, the metal terminal further comprising a protrusion, the protrusion to form a second gap between the flat surface and the metal terminal.

5. The surge protection device of claim 4, wherein the second gap controls the quantity of soldering paste applied to the metal terminal.

6. The surge protection device of claim 4, wherein the gap has a first width and the second gap has a second width, the first width being approximately the same as the second width.

7. The surge protection device of claim 1, the metal terminal further comprising a protrusion, the protrusion to form a gap between the flat surface and the metal terminal.

8. The surge protection device of claim 7, wherein the protrusion is a first rectangular shape cut into a second rectangular shape of the metal terminal, wherein the second rectangular shape is larger than the first rectangular shape.

9. The surge protection device of claim 1, wherein the flat surface becomes uncoupled from the metal terminal in response to an overvoltage event for which the surge protection device is rated.

* * * * *